United States Patent
Fujita et al.

(10) Patent No.: US 7,822,159 B2
(45) Date of Patent: Oct. 26, 2010

(54) MASTER SIDE COMMUNICATION APPARATUS AND SLAVE SIDE COMMUNICATION APPARATUS

(75) Inventors: Suguru Fujita, Tokyo (JP); Masahiro Mimura, Tokyo (JP); Kazuaki Takahashi, Tokyo (JP); Yoshinori Kunieda, Tokyo (JP); Noriyuki Ueki, Tokyo (JP)

(73) Assignee: Panasonic Corporation, Osaka (JP)

( * ) Notice: Subject to any disclaimer, the term of this patent is extended or adjusted under 35 U.S.C. 154(b) by 270 days.

(21) Appl. No.: 11/568,705

(22) PCT Filed: Mar. 1, 2006

(86) PCT No.: PCT/JP2006/303847
§ 371 (c)(1),
(2), (4) Date: Nov. 6, 2006

(87) PCT Pub. No.: WO2006/095616
PCT Pub. Date: Sep. 14, 2006

(65) Prior Publication Data
US 2008/0292037 A1 Nov. 27, 2008

(30) Foreign Application Priority Data

Mar. 9, 2005 (JP) .............................. 2005-065289
Feb. 24, 2006 (JP) .............................. 2006-048234

(51) Int. Cl.
*H04L 7/00* (2006.01)
(52) U.S. Cl. ..................... 375/354; 375/355; 375/353
(58) Field of Classification Search ............. 375/354, 375/355, 353
See application file for complete search history.

(56) References Cited

U.S. PATENT DOCUMENTS 4,442,527 A * 4/1984 Munday ..................... 375/134

(Continued)

FOREIGN PATENT DOCUMENTS

JP    59-183538 A    10/1984

(Continued)

*Primary Examiner*—Shuwang Liu
*Assistant Examiner*—Kenneth Lam
(74) *Attorney, Agent, or Firm*—Pearne & Gordon LLP

(57) ABSTRACT

A master side communication apparatus and a slave side communication apparatus wherein the structure of a receiving part of the slave side communication apparatus is simplified to achieve a reduced size, a reduced power consumption and a reduced cost. The master side communication apparatus performs a communication in synchronism with the slave side communication apparatus having no synchronization timing adjusting function. A transport signal generating timing adjusting part of the master side communication apparatus acquires, from the slave side communication apparatus, synchronization signal generation timing information used when the slave side communication apparatus receives the transport signal from the master side communication apparatus. The transport signal generating timing adjusting part varies and adjusts, based on the acquired information, the transmission timing of the signal to be transmitted to the slave side communication apparatus. A transmitting part transmits the transport signal at the adjust transmission timing. The occurrence timing of the transport signal is varied and adjusted until the slave side communication apparatus becomes able to receive the transport signal from the master side communication apparatus.

15 Claims, 12 Drawing Sheets

U.S. PATENT DOCUMENTS

| | | | |
|---|---|---|---|
| 6,289,746 B1 * | 9/2001 | Fu et al. | 73/861.95 |
| 7,099,421 B2 * | 8/2006 | Simmons et al. | 375/354 |
| 7,532,591 B2 * | 5/2009 | Moon et al. | 370/312 |
| 2005/0014474 A1 * | 1/2005 | Jitsukawa et al. | 455/101 |
| 2005/0117628 A1 * | 6/2005 | Brethour et al. | 375/130 |
| 2005/0265428 A1 * | 12/2005 | McCorkle | 375/130 |
| 2006/0093077 A1 * | 5/2006 | El Fawal et al. | 375/343 |
| 2007/0258555 A1 * | 11/2007 | Sidiropoulos | 375/371 |

FOREIGN PATENT DOCUMENTS

| | | |
|---|---|---|
| JP | 02-029043 A | 1/1990 |
| JP | 04-113741 A | 4/1992 |
| JP | 2003-51761 | 2/2003 |
| JP | 2003-324412 A | 11/2003 |
| WO | 00/14910 A1 | 3/2000 |
| WO | 01/93442 A1 | 12/2001 |

* cited by examiner

MASTER SIDE COMMUNICATION APPARATUS AND SLAVE SIDE COMMUNICATION APPARATUS

TECHNICAL FIELD

The present invention relates to communication devices using wideband signals such as signals having pulse waveforms.

BACKGROUND ART

There is a rapid spread of devices compliant to wireless local area network (hereinafter, LAN) such as IEEE 802.11b standard established by the Institute of Electrical and Electronics Engineers based in the United States. Also, it is expected that a seamless network society will arrive where audio visual (hereinafter, AV) devices are connected with personal computers by a wireless network or other means. With this background, there is a demand for a technique to produce small and high-speed data communication devices at low cost.

As an approach to the technique, a communication system called Ultra Wide band (hereinafter, UWB) using a pulse-like modulation signal is drawing attention.

FIG. 11 is a block diagram of a UWB wireless device as an example of a conventional communication device. This conventional example includes a plurality of receiving systems. Antenna 1001 receives a signal, and amplifier/filter 1002 amplifies and filters the signal to remove unwanted signals. Automatic gain controller (hereinafter, AGC) 1003 controls the gain of the signal, and receiver systems 1011A and 1011B receive the gain-controlled signal. In receiver systems 1011A and 1011B, mixers 1004A and 1004B correlate the gain-controlled signal from AGC 1003 with pulse signals generated by pulse generators 1007A and 1007B, respectively.

Filters 1005A and 1005B filter the signals from mixers 1004A and 1004B, respectively, to remove unwanted signals. Analog/digital (hereinafter, A/D) converters 1006A and 1006B convert the filtered signals to digital signals. Controller 1010 determines the correlation and improves the correlation by controlling the timing of timing generators 1008A and 1008B with clock control signals and performing synchronization acquisition and holding of the signals received from controller 1010 and signals from local oscillation (hereinafter, LO) generators 1009A and 1009B, respectively. One example of this conventional communication device is disclosed in International Publication No. WO01/93442.

FIG. 12 is a block diagram showing a structure of another conventional communication device, and more specifically, a block structure of a UWB communication device. The block diagram of FIG. 12 shows transmitter power control, which equalizes the electric power levels of signals that a communication device receives from a plurality of partner communication devices in the following manner. The communication device receives a reception signal from a partner communication device and returns the reception power level information obtained from the reception signal, thereby changing the transmission power depending on the partner communication device.

The transmitter power control is a technique not unique to UWB but used widely for wireless communication, and FIG. 12 shows one example of the application of transmitter power control to UWB. In the communication device of this conventional example, receiver 2201 receives impulse trains transmitted from a plurality of other communication devices (unillustrated) via antenna 2205, and measurer 2202 measures the reception characteristics. Measurer 2202 includes signal-to-noise ratio measurer 2202A, reception signal intensity measurer 2202B, and error rate measurer 2202C.

These measurement results are used to detect the communication device that is required to control its transmission level. Information S2202, which indicates the detected communication device, is outputted to transmission-level-control-information generator 2203. Transmission-level-control-information generator 2203 generates transmission level control information S2203 to control the transmission level of the detected communication device, and transmitter 2204 transmits this information. This results in the control of the transmission level of the communication device that has received the transmission level control information. As a result, the reception characteristics of the impulse trains received from the plurality of other communication devices become equal to each other. This enables receiver 2201 to receive impulse trains transmitted concurrently from the plurality of other communication devices. An example of this conventional communication device is disclosed in Japanese Patent Unexamined Publication No. 2003-51761.

However, the conventional structure of International Publication No. WO01/93442 mentioned above includes a plurality of receiving systems and adjusts sync timing based on the correlation as described earlier. The structure requires that a plurality of receiving system signals be processed at high speed in a complicated decision flow. This might cause the receiver configuration to be complicated and large, thereby increasing the power consumption and price of the device. This is particularly difficult to achieve in a slave communication device such as a portable device. On the other hand, the conventional structure to control transmission power as described in Japanese Patent Unexamined Publication No. 2003-51761 mentioned above can reduce problems such as the inability to adjust sync timing due to signal interference (inability to pull into synchronism) and jitter increase during synchronization tracking. This structure, however, may still cause the receiver configuration to be complicated and large, thereby increasing the power consumption and price of the device. This is particularly difficult to achieve in a slave communication device such as a portable device.

SUMMARY OF THE INVENTION

The present invention is directed to provide a slave communication device, such as a portable device, which has a simplified receiver configuration so as to be reduced in size, price, and power consumption by performing sync timing adjustment exclusively in a master communication device, which can be designed to be large.

The master communication device of the present invention communicates in synchronization with a slave communication device with no sync timing adjustment feature and includes a transmission-signal-generation-timing adjuster and a transmitter. The transmission-signal-generation-timing adjuster receives sync signal generation timing information from the slave communication device, the sync signal generation timing information indicating a generation timing of a sync signal to be used when the slave communication device receives a transmission signal from the master communication device. The transmission-signal-generation-timing adjuster then changes and adjusts a transmission timing of a signal to be transmitted to the slave communication device based on the sync signal generation timing information thus received. The transmitter transmits the transmission signal at the transmission timing adjusted by the transmission-signal-generation-timing adjuster. The master communication device makes the transmission-signal-generation-timing adjuster adjust a generation timing of the transmission signal until the slave communication device can receive the transmission signal from the master communication device.

In this structure, timing adjustment can be performed in the master communication device with a sync timing adjustment feature. This enables components that are conventionally required on the receiver side of every device, such as multistage receiving-system branches and synchronization loops to be provided only in the master communication device. As a result, the slave communication device with no sync timing adjustment feature can have a simplified receiver configuration so as to be reduced in power consumption and price.

The master communication device of the present invention may use a variable delay unit capable of varying a delay time of a signal as the transmission-signal-generation-timing adjuster. This facilitates timing adjustment.

In the master communication device of the present invention, the transmitter may include a pulse generator capable of arbitrarily changing a pulse generation time, and a modulator for modulating pulses, the pulses being communication data to be transmitted to the slave communication device and being generated by the pulse generator. The transmission-signal-generation-timing adjuster may adjust at least one of the generation timing of the pulses and the generation timing of frames which are each a series of the communication data encoded.

In this structure, the timing adjustment for pulse and frame acquisition and holding (hereinafter, acquisition and holding can be collectively referred to as synchronization) is performed in the master communication device. This can reduce the number of receiving system branches and adjustment circuits for pulse and frame synchronization in the slave communication device. As a result, the slave communication device can have a simplified receiver configuration so as to be reduced in power consumption and price.

In the master communication device of the present invention, the transmission-signal-generation-timing adjuster may include a transmission timing storage for storing respective transmission timings corresponding to the plurality of slave communication devices. The transmitter may communicate with the plurality of slave communication devices at the respective transmission timings stored in the transmission timing storage. As a result, the master communication device can communicate with a plurality of slave communication devices.

The master communication device of the present invention may have a plurality of transmitters which communicate with the plurality of slave communication devices at the respective transmission timings from the transmission-signal-generation-timing adjuster, the respective transmission timings corresponding to the plurality of slave communication devices. As a result, the master communication device can communicate with a plurality of slave communication devices.

The slave communication device of the present invention with no sync timing adjustment feature communicates in synchronization with a master communication device with a sync timing adjustment feature. The slave communication device includes a sync signal generator, a correlator, a correlation detector, and a timing information transmitter. The sync signal generator generates a sync signal to be used upon receiving a transmission signal from the master communication device. The correlator correlates the transmission signal from the master communication device with the sync signal generated by the sync signal generator. The correlation detector detects correlation from an output of the correlator. The timing information transmitter transmits an output of the correlation detector as sync signal generation timing information.

With this structure, timing adjustment for pulse synchronization and frame synchronization can be all performed in the master communication device, so that the number of receiving system branches and adjustment circuits for pulse and frame synchronization can be minimized in the slave communication device. As a result, the slave communication device can have a simplified receiver configuration so as to be reduced in power consumption and price.

In the slave communication device of the present invention, the sync signal generation timing information may include pulse phase correlation for pulse synchronization. This structure enables the master communication device to be informed of the phase shift between the pulse signal of its own and the pulse signal for synchronous detection of the slave communication device, and to transmit a signal after adjusting the time corresponding to the phase shift. As a result, the slave communication device can achieve pulse synchronization without timing adjustment.

In the slave communication device of the present invention, the sync signal generation timing information may include correlation with a frame for frame synchronization. This structure enables the master communication device to be informed of the positional shift between the frame of the slave communication device and the signal transmission timing, and to transmit a signal after adjusting the time corresponding to the positional shift. As a result, the slave communication device can achieve frame synchronization without timing adjustment.

In the slave communication device of the present invention, the timing information transmitter may transmit the sync signal generation timing information by changing a reflection condition of the transmission signal from the master communication device. This structure enables the slave communication device to change the reflection condition of a transmission signal from the master communication device so as to reduce the power consumption of the transmission system when the slave communication device transmits sync signal generation timing information.

In the master communication device of the present invention, the transmitter may include a pulse generator for changing at least one of a shape and repetition intervals of generated pulses. Upon starting a synchronous operation with the slave communication device, the transmitter may transmit pulses with a high ease of synchronization acquisition first and then switch the pulses with pulses capable of precise synchronization. This structure enables synchronization to be established in a short time by switching between transmit pulses that can establish low-precision synchronization in a short time and transmit pulses that can establish high-precision synchronization.

In the master communication device of the present invention, the pulse generator may change a width of the generated pulses. Upon starting a synchronous operation with the slave communication device, the transmitter may transmit pulses having a width large enough to have the time to be correlated by the slave communication device first and then switch the pulses with short-width pulses capable of precise synchronization. With this structure, low-precision synchronization is established in a short time with an increased pulse width and then high-precision synchronization is established with a reduced pulse width. This results in a reduction in synchronization time to achieve high-speed communication.

In the master communication device of the present invention, the pulse generator may change repetition intervals of the generated pulses. Upon starting a synchronous operation with the slave communication device, the transmitter may transmit pulses with short repetition intervals so as to transmit the pulses at frequent intervals first, and then switch the pulses with pulses with long repetition intervals capable of precise synchronization. In this structure, the repetition intervals are shortened to increase the chance of detecting correlation, and high-precision synchronization is established after low-precision synchronization is established in a short time. This can reduce the synchronization time to achieve high-speed communication.

In the master communication device of the present invention, the pulse generator may change repetition intervals of the generated pulses. Upon starting a synchronous operation with the slave communication device, the transmitter may transmit pulses with a high peak voltage and long repetition intervals so as to transmit the pulses at infrequent intervals first, and then switch the pulses with pulses with short repetition intervals. In this structure, the peak value of each pulse can be increased by making the pulse repetition intervals longer. This prevents the signal from being buried in noise, allowing pulse synchronization to be established in a short time although it is low precision. After this, the pulse peak value is lowered and the pulse repetition intervals are made shorter to establish high-precision synchronization. This results in a reduction in the synchronization time to achieve high-speed communication.

In the master communication device of the present invention, the repetition intervals may be changed intentionally and arbitrarily so as to control the transmission timing, and the distance to the slave communication device may be calculated based on the time elapsed to obtain the sync signal generation timing information. This structure can calculate the distance between the devices.

Figure 1:
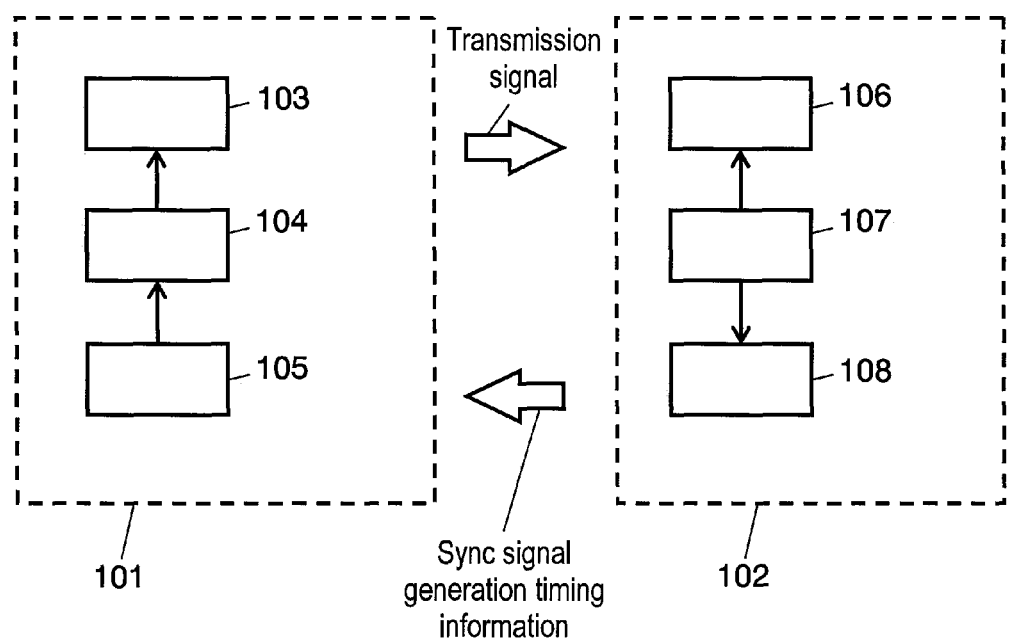
FIG. 1 is a block diagram showing a structure of a master communication device and a slave communication device of a first embodiment of the present invention.

REFERENCE MARKS IN THE DRAWINGS 101, 201, 301, 401, 501, 1201 master communication device
102, 202, 302, 303, 502, 1202 slave communication device
103, 215, 307A, 307B, 511 transmitter
104 transmission-signal-generation-timing adjuster
105 sync-signal-generation-timing-information receiver
106 reception signal demodulator
107 sync signal generator
108 sync-signal-generation-timing-information transmitter
203A, 203B, 203C, 203D, 216A, 216B, 503, 516A, 516B, 1208, 1211, 1222, 1223 antenna
204, 208, 405A, 405B, 1203, 1213 pulse generator
205, 210, 407A, 407B, 1204A, 1204B modulator
206, 209, 406A, 406B, 1210A, 1210B, 1210C encoder
207, 305, 306A, 306B, 402, 512 receiver
211, 506 correlation signal generator
212, 505, 1212A, 1212B correlator
213, 507, 1214A, 1214B pulse acquisition-and-correlation determiner
214, 1217A, 1217B frame acquisition-and-correlation determiner
304 generation timing storage
403 out-of-sync information distributor
404A, 404B generation timing adjuster
408 synthesizer
504 reflection condition changer
508A switch
509 transmission data generator
510 distributor
513 delay unit
1205A, 1205B rectangular wave generator
1206A, 1206B, 1206C, 1206D variable delay unit
1207A, 1207B, 1207C bandlimiting filter
1209A, 1209B data
1215A, 1216B, 1220A, 1220B determiner
1215B, 1216A, 1219A, 1219B integrator
1218A, 1218B code correlator
1221 received-power detector

DETAILED DESCRIPTION OF PREFERRED EMBODIMENTS

Embodiments of the present invention will be described as follows with reference to drawings.

First Exemplary Embodiment

FIG. 1 is a block diagram showing a structure of a master communication device and a slave communication device of a first embodiment of the present invention. The present embodiment is provided with a single master communication device and a single slave communication device.

The following is a description of the structure of master communication device 101 and slave communication device

102. Master communication device 101 is a device with a sync timing adjustment feature, and includes transmitter 103, sync-signal-generation-timing-information receiver 105, and transmission-signal-generation-timing adjuster 104. Transmitter 103 generates a transmission signal of the master communication device. Sync-signal-generation-timing-information receiver 105 receives sync signal generation timing information from slave communication device 102. Transmission-signal-generation-timing adjuster 104 determines the transmission timing based on the sync signal generation timing information received.

On the other hand, slave communication device 102 is a device with no sync timing adjustment feature, and includes reception signal demodulator 106, sync signal generator 107, and sync-signal-generation-timing-information transmitter 108. Reception signal demodulator 106 receives and demodulates a signal from master communication device 101. Sync signal generator 107 generates a sync signal to be used for the synchronization with the signal from master communication device 101 when reception signal demodulator 106 demodulates the reception signal. Sync-signal-generation-timing-information transmitter 108 detects and determines the correlation between the reception signal and the sync signal, and transmits the result as sync signal generation timing information to master communication device 101.

The following is a description of the operation of the master communication device and the slave communication device of the present embodiment. When master communication device 101 communicates with slave communication device 102, slave communication device 102 can receive and demodulate a transmission signal (hereinafter, signal "A") from master communication device 101 under the following condition. The signal "A" received by slave communication device 102 must be synchronous with a sync signal generated by sync signal generator 107 of slave communication device 102. Examples of the synchronization requirement include agreement in signal phase, agreement in frequency, agreement in frame position, and agreement in code sequence.

In slave communication device 102, sync signal generator 107 generates the sync signal at any timing. Reception signal demodulator 106 correlates and demodulates the sync signal and the received signal "A". However, without timing adjustment, the sync signal and the received signal "A" are not synchronized with each other. This is why timing adjustment is necessary to meet the aforementioned synchronization requirements (such as agreement in signal phase, agreement in frequency, agreement in frame position, and agreement in code sequence). Although the details will be described later, slave communication device 102 does not have a sync timing adjustment feature and only performs the generation of a signal for timing adjustment. The timing adjustment is performed by master communication device 101.

In slave communication device 102, the sync signal generation timing information, which is a signal for timing adjustment, is generated by sync-signal-generation-timing-information transmitter 108 based on the received signal "A" and the sync signal, and transmitted to master communication device 101.

The sync signal generation timing information includes the correlation between the signals, the strength of received power, and the error rate of the reception signal. The sync signal generation timing information is received by sync-signal-generation-timing-information receiver 105 of master communication device 101. Sync-signal-generation-timing-information receiver 105 reads out out-of-sync information between the signal "A" transmitted from its own station (master communication device 101) and the signal "A" received by slave communication device 102. The out-of-sync information is inputted to transmission-signal-generation-timing adjuster 104. Transmission-signal-generation-timing adjuster 104 changes the transmission timing of its own station (master communication device 101) so as to achieve synchronization with slave communication device 102.

Figure 2:
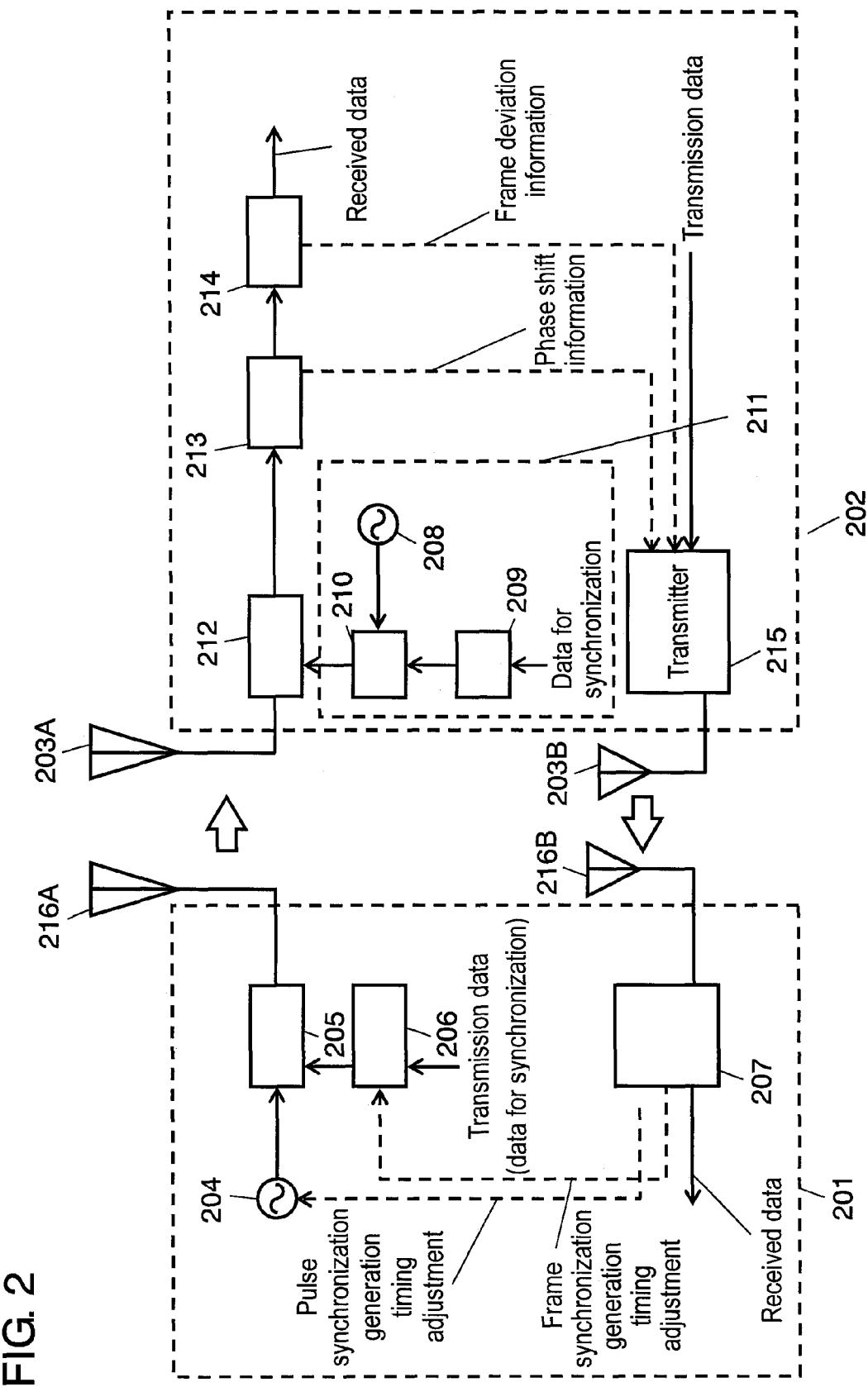
FIG. 2 is a block diagram showing another structure of the master communication device and the slave communication device of the first embodiment.

FIG. 2 is a block diagram showing a more specific structure of the master communication device and the slave communication device of the present embodiment. In master communication device 201, transmission data to be transmitted to slave communication device 202 is encoded using a code sequence generated by encoder 206. The transmission data can be data used only for the establishment of synchronization. Although the transmission data is encoded by encoder 206 before being transmitted in the present embodiment, encoding is not essential.

The encoded transmission data is composed of pulses generated by pulse generator 204, modulated by modulator 205, and transmitted from antenna 216A. The transmission data transmitted from master communication device 201 is received (hereinafter, reception signal) by antenna 203A of slave communication device 202 that is a communication partner. The reception signal is then correlated with a correlation signal for synchronization by correlator 212. The correlation signal for synchronization is generated by correlation signal generator 211 including encoder 209, pulse generator 208, and modulator 210. Then, pulse acquisition-and-correlation determiner 213 detects the deviation or correlation between the pulses generated by pulse generator 208 and the pulses of the reception signal, and outputs the result to transmitter 215 as pulse phase shift information or the phase correlation information.

Frame acquisition-and-correlation determiner 214 detects the deviation or correlation between the code sequence generated by encoder 209 and the code sequence of the reception signal, and outputs the result to transmitter 215 as frame deviation information or frame correlation. One example of the frame acquisition is the agreement between the code sequence which is encoded in the transmitter side of master communication device 201 and the code sequence generated by encoder 209 of slave communication device 202. Decoding cannot be performed even if the same code sequences are used, unless the code sequences are started at the same time. Therefore, the coincidence of the start positions is regarded as frame synchronization. Transmitter 215 transmits the received "frame deviation information" to master communication device 201.

Master communication device 201 demodulates the deviation information received by receiver 207 so as to change and adjust the time of generation of pulses and a code sequence in pulse generator 204 and encoder 206, respectively, according to the deviation time. These series of operations are repeated until synchronization is established. When the synchronization is established, transmitter 215 transmits data to master communication device 201, whereas receiver 207 receives data from slave communication device 202.

Changes and adjustments in the time of generation of the pulses and code sequence in pulse generator 204 and encoder 206 can be performed by changing the generation timing in pulse generator 204 and encoder 206, or by combining pulse generator 204 and encoder 206 with a delay unit having a variable delay amount.

As described hereinbefore, in the master communication device and slave communication device of the present embodiment, sync timing adjustment is performed exclusively in the master communication device, which can be designed to be large. This allows the slave communication device such as a portable device to have a simplified receiver configuration, thereby being reduced in size, price, and power consumption.

The aforementioned structure performs pulse synchronization (acquisition and holding) and frame synchronization (acquisition and holding) such as a code sequence. Alternatively, it is possible to have a structure that performs either pulse synchronization or frame synchronization. In the present invention, sync timing variability (modification) means the ability to detect the timing of a reception signal and to adjust the timing difference with its own station. A device that cannot detect or adjust the timing of a reception signal is regarded as a sync timing invariable device even if it has a delay unit having a variable delay amount.

Although there is no description about modulation scheme used for communication, there is no limitation to communication system. Examples of the modulation scheme include On-Off Keying (hereinafter, OOK), Biphase Shift Keying (hereinafter, BPSK), Quadrature Phase Shift Keying (hereinafter, QPSK), and Pulse Position Modulation (hereinafter, PPM).

Figure 3:
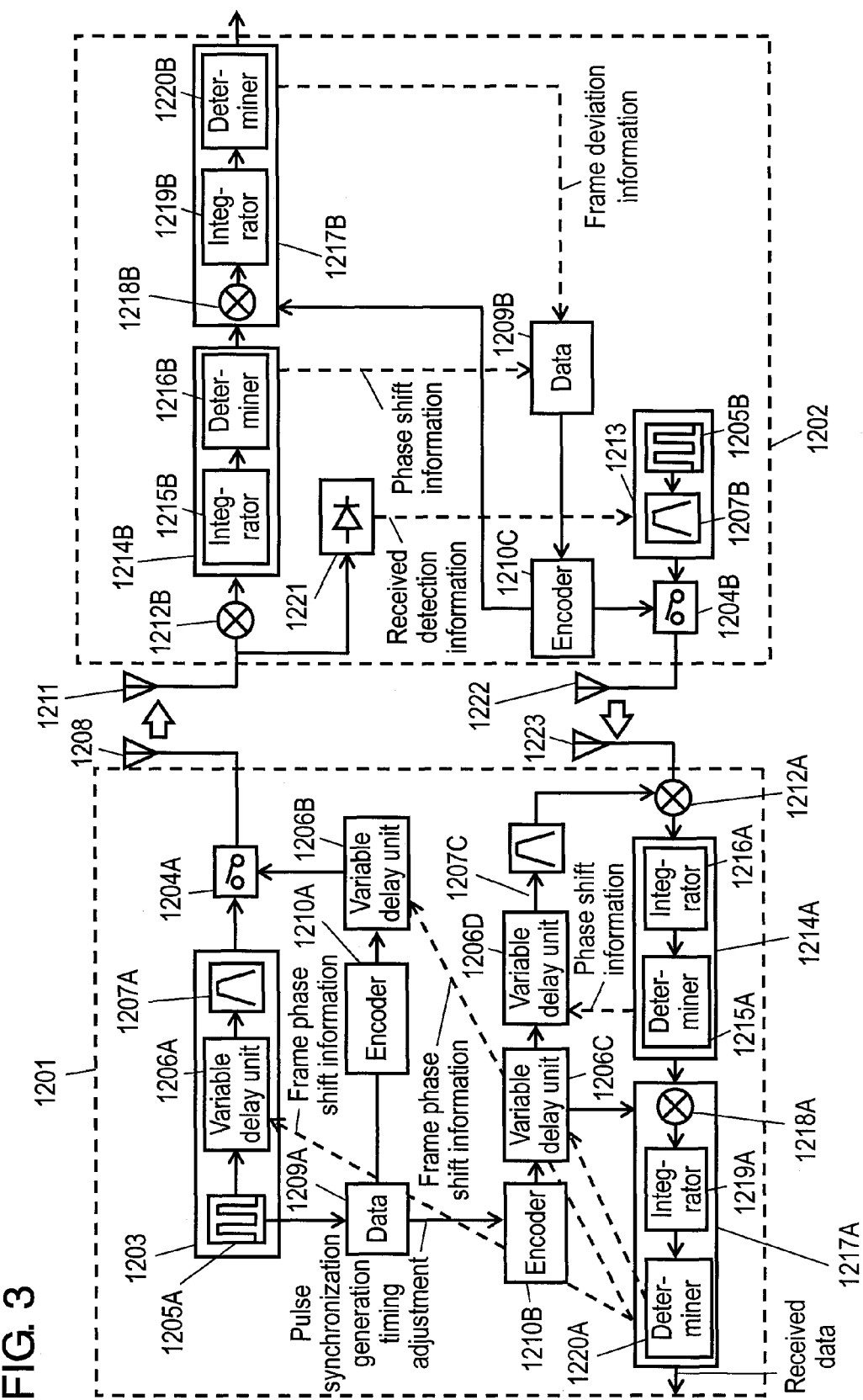
FIG. 3 is a block diagram showing another structure of the master communication device and the slave communication device of the first embodiment.

FIG. 3 is a block diagram showing another structure of the master and slave communication devices of the present embodiment with OOK modulation and BPSK modulation. Master communication device 1201 and slave communication device 1202 both have a transmitting function and a receiving function. Similar to the former embodiment, slave communication device 1202 does not have a sync adjustment feature, and sync adjustment about communication is performed by master communication device 1201.

First, the transmitting function of master communication device 1201 will be described as follows. The main components to execute the transmitting function are pulse generator 1203 and modulator 1204A. Pulse generator 1203 can be realized by various ways and composed of rectangular wave generator 1205A, variable delay 1206A, and bandlimiting filter 1207A. Rectangular wave generator 1205A generates a rectangular wave signal from which transmit pulses are generated and which determines the repetition frequency and pulse width of the transmit pulses.

Rectangular wave generator 1205A generally uses as a reference signal an output of an unillustrated crystal oscillator having a high frequency stability. The reference signal is multiplied to generate a signal having a high repetition frequency, and the pulse width is adjusted by combining the delay unit with a comparator. This results in a rectangular wave signal having an arbitrary repetition frequency and an arbitrary pulse width. The generated rectangular wave signal is delayed by a certain period of time by variable delay unit 1206A. Later, the signals with communication frequencies are selected by bandlimiting filter 1207A, amplitude-modulated by modulator 1204A, and transmitted by antenna 1208. The delay time of variable delay unit 1206A will be described later as the operation of the timing adjustment. Modulator 1204A can be a circuit such as a switch or a mixer.

In the case of BPSK modulation, a mixer or the like is used because phase information is required. The modulated signal to be applied to modulator 1204A is outputted from data 1209A. The source of the data can be information inside the communication device or information received from an external device such as a personal computer (hereinafter, PC) and a network.

The present embodiment includes encoder 1210A for data encoding; however, encoder 1210A is unnecessary when data is not encoded. The output of encoder 1210A is inputted as a modulated signal to modulator 1204A after being delayed by a certain period of time by variable delay unit 1206B. The delay-time setting operation of variable delay unit 1206B will be described later.

The following is a description of the receiving function of slave communication device 1202. Antenna 1211A receives a reception signal and inputs it to correlator 1212B, which multiplies the signal by a template signal generated by pulse generator 1213 and generates a receiving correlation signal. Pulse generator 1213 can be composed of rectangular wave generator 1205B and bandlimiting filter 1207B. The receiving correlation signal is inputted to pulse acquisition-and-correlation determiner 1214B and determined whether it is a desired signal or not.

Pulse acquisition-and-correlation determiner 1214B may be composed of integrator 1215B and determiner 1216B. The receiving correlation signal is integrated by integrator 1215B for a predetermined period of time, and threshold-detected by determiner 1216B so as to be outputted as the result of the correlation determination. Also, the difference between the receiving correlation signal and the threshold is outputted as phase shift information. The output of the correlation determination is inputted to frame acquisition-and-correlation determiner 1217B so as to be correlated with the code sequence.

Frame acquisition-and-correlation determiner 1217B may be composed of code correlator 1218B, integrator 1219B, and determiner 1220B. Code correlator 1218B multiplies the output of the correlation determination by the code sequence. Integrator 1219B integrates the multiplied result for a predetermined period of time, and determiner 1220B performs threshold detection to output the result of the frame correlation as received data and also outputs the difference between the receiving correlation signal and the threshold as frame deviation information.

Slave communication device 1202 may include received-power detector 1221 so as to operate a circuit only when a signal reception is detected. The circuit to be operated in this case can be pulse generator 1213.

The following is a description of the transmitting function of slave communication device 1202. Information to be transmitted by slave communication device 1202 includes information generated by data 1209B itself as well as phase shift information and frame deviation information. These different kinds of information are synthesized by data 1209B, encoded by encoder 1210C, and inputted to modulator 1204B. Modulator 1204B modulates the pulse generated by pulse generator 1213 with the information obtained from encoder 1210C. The output is transmitted from antenna 1222.

The following is a description of the receiving function of master communication device 1201. A reception signal received by antenna 1223 is multiplied by a template signal by correlator 1212A so as to form a correlated signal. This template signal is obtained as follows. The rectangular wave generated by rectangular wave generator 1205A is formed into a data sequence by data 1209A; encoded by encoder 1210B; provided with an initial delay by variable delay units 1206C and 1206D; and formed into a signal in a desired frequency band by bandlimiting filter 1207C.

The correlated signal, which is the output of correlator 1212A, is inputted to pulse acquisition-and-correlation determiner 1214A to determine the correlation. When there is a predetermined correlation, the pulse position is regarded to be acquired and the determination of the code correlation is started. On the other hand, when there is no predetermined correlation, the amount of delay of variable delay unit 1206D is changed by a predetermined amount.

Pulse acquisition-and-correlation determiner 1214A may determine the presence or absence of correlation by allowing integrator 1216A to perform integration only by a predetermined period of time, and determiner 1215A to perform threshold detection. The amount of delay of variable delay unit 1206D is changed. The code correlation can be determined using frame acquisition-and-correlation determiner 1217A, which can be composed of code correlator 1218A, integrator 1219A, and determiner 1220A.

A signal exceeding the threshold of determiner 1220A is determined to be code correlated and becomes received data. When the correlation is low, the amount of delay of variable delay unit 1206C is changed. The amount of delay of variable delay unit 1206C to be changed may be about the same as the distance between the pulses. The change of the amount of delay is continued until the correlation exceeds the threshold.

The received data of master communication device 1201 includes the phase shift information and frame deviation information of slave communication device 1202. The amount of delay of variable delay units 1206A and 1206B are changed based on these pieces of information. When the amount of delay to be changed is determined, a calculation formula or a table is used to convert the phase shift information and the frame deviation information of slave communication device 1202 indicating the output values of determiners 1216B and 1220B to a predetermined amount of delay. As described above, slave communication device 1202 never performs timing adjustment using a variable delay unit.

Although the aforementioned description is focused on pulse communication, the present invention is also applicable to communication with a sine wave and is particularly effective to communication such as CDMA requiring frame synchronization. In a phase locked loop generally performed in communication with a sine wave, the above-described pulse acquisition-and-correlation determiner may be equipped with a phase difference detection circuit that is used in a general phase locked loop. This enables the present invention to be applied to frequency synchronization by detecting a frequency difference and then outputting the difference as phase shift information.

Second Exemplary Embodiment

Figure 4:
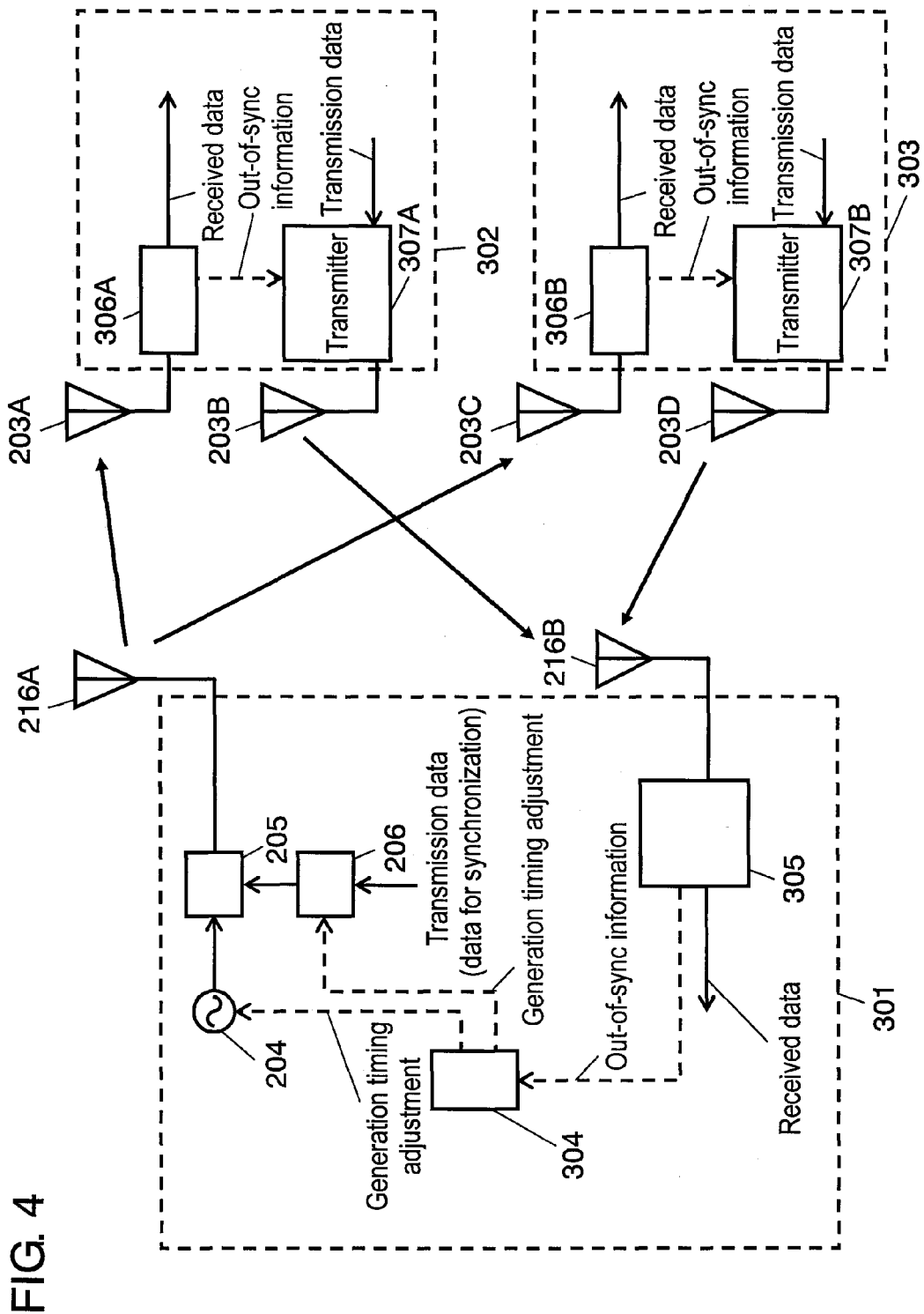
FIG. 4 is a block diagram showing a structure of a master communication device and a slave communication device of a second embodiment of the present invention.
Figure 5:
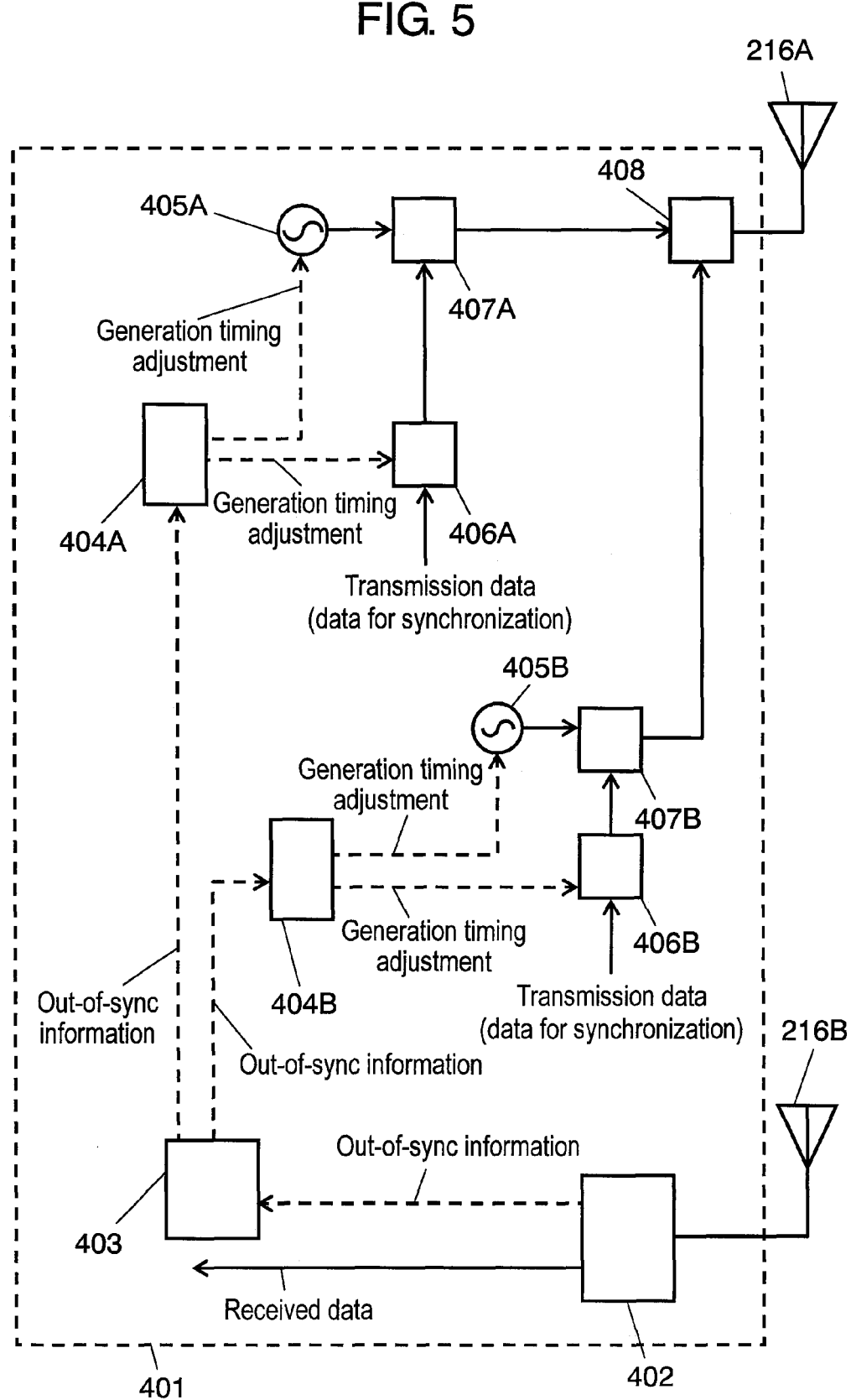
FIG. 5 is a block diagram showing another structure of the master communication device of the second embodiment.

FIGS. 4 and 5 are block diagrams showing structures of a master communication device and a slave communication device of a second embodiment of the present invention. The present embodiment differs from the first embodiment in that the master communication device of each of FIGS. 4 and 5 communicates in synchronization with a plurality of slave communication devices.

In FIG. 4, master communication device 301 includes pulse generator 204, modulator 205, encoder 206, antenna 216A, antenna 216B, generation timing storage 304, and receiver 305. Slave communication device 302 includes antenna 203A, antenna 203B, receiver 306A, and transmitter 307A. Slave communication device 303 includes antenna 203C, antenna 203D, receiver 306B, and transmitter 307B.

As described in detail in the first embodiment, the master communication device with a timing adjustment feature performs communication synchronously with slave communication devices with no timing adjustment feature. In this case, when there are a plurality of slave communication devices with no sync timing adjustment feature, the master communication device with the timing adjustment feature is required to perform communication synchronously with the respective slave communication devices. Two examples will be described below.

In FIG. 4, master communication device 301 stores the sync timing with slave communication device 302 and the sync timing with slave communication device 303 in ingeneration timing storage 304, which is a transmission timing storage. Master communication device 301 changes or adjusts the generation timing of pulses and a code sequence in pulse generator 204 and encoder 206 at the transmission timing corresponding to the respective communication partners. In the case of pulse communication, the pulse generation time in communication time is short enough to generate all the signals for the plurality of communication partners by one pair of pulse generator 204 and encoder 206.

FIG. 5 shows another structure of the master communication device that generates a plurality of sync timings. Master communication device 401 shown in FIG. 5 differs from the one shown in FIG. 4 by having more than one functional block. While the structure shown in FIG. 4 has a single pulse generator 204, the structure shown in FIG. 5 has two pulse generators 405A and 405B. Similarly, while the structure of FIG. 4 has a single encoder 206, the structure of FIG. 5 has encoders 406A and encoder 406B. Similarly, while the structure of FIG. 4 has a single generation timing storage 304, the structure of FIG. 5 has generation timing adjuster 404A and generation timing adjuster 404B. In the structure of FIG. 5, out-of-sync information received is distributed for the respective communication partners by out-of-sync information distributor 403, thereby performing the timing change and adjustment separately depending on the communication partner.

While the structure of FIG. 4 has a single modulator 205, the structure of FIG. 5 has modulator 407A and modulator 407B. Receiver 402 of FIG. 5 corresponds to receiver 305 of FIG. 4. In this structure, the two functional blocks generate transmission signals separately, so that the transmission signals are synthesized by synthesizer 408 and transmitted from a single antenna 216A. Having a plurality of transmission systems unlike the structure of FIG. 4 is likely to increase the device in size, but can reduce the number of pulses and code sequences, in other words, reduce the speed.

As described hereinbefore, in the master and slave communication devices of the second embodiment of the present invention, sync timing adjustment is performed exclusively in the master communication device, which can be designed to be large. This allows the slave communication device such as a portable device to have a simplified receiver configuration, thereby being reduced in size, price, and power consumption.

The master communication device of the present embodiment includes synthesizer 408; however, it is alternatively possible to provide each transmission system with an antenna instead of a synthesizer.

Third Exemplary Embodiment

Figure 6:
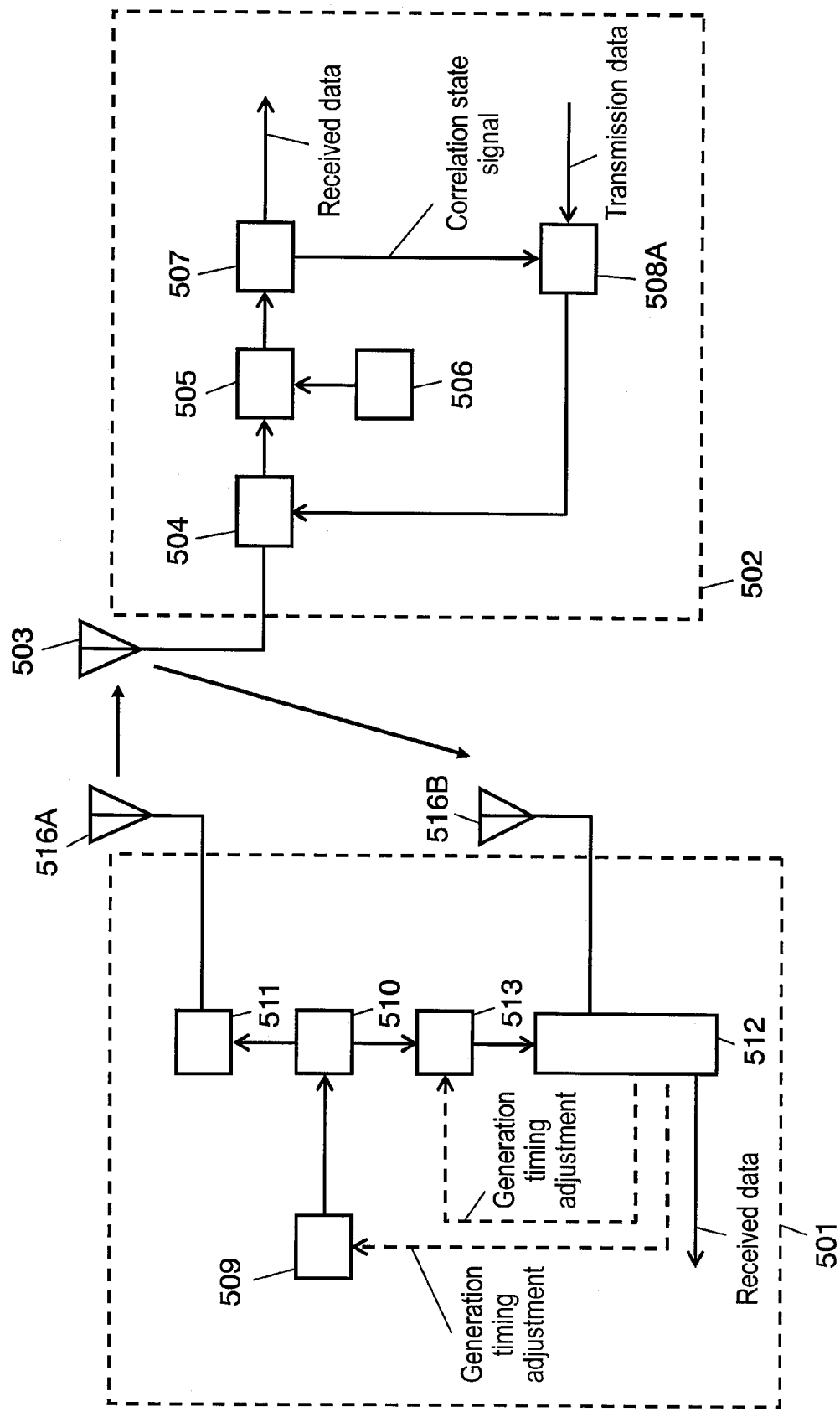
FIG. 6 is a block diagram showing a structure of a master communication device and a slave communication device of a third embodiment of the present invention.

FIG. 6 is a block diagram showing a structure of a master communication device and a slave communication device of a third embodiment of the present invention. The present embodiment differs from the first embodiment in that the sync signal generation timing information, which is out-of-sync information, is transmitted by the reflected wave of a signal transmitted from the master communication device by changing the terminal condition of the receiving antenna of the slave communication device.

In FIG. 6, slave communication device 502 which performs reception includes reflection condition changer 504 for changing the terminal condition of antenna 503. In slave communication device 502, correlator 505 correlates the reception signal and the correlated signal generated by correlation signal generator 506. Pulse acquisition-and-correlation determiner 507 detects the correlation so as to generate a correlation state signal, which is the sync signal generation timing information. When the correlation is low, that is, when there is no synchronization, switch 508A is switched to transmit the correlation state signal.

The correlation state signal is returned by making reflection condition changer 504 reflect the transmission signal from master communication device 501 by alternately switching between a matched impedance of 50Ω and a short-circuit impedance of 0Ω. As a result, the correlation state signal is received and demodulated by receiver 512 of master communication device 501. A correlated signal at the time of demodulation is generated by making distributor 510 distribute the signal of transmission data generator 509 and delay unit 513 give a delay corresponding to the propagation time of the signal because master communication device 501 receives the signal transmitted from its own station.

Antenna 516A of master communication device 501 corresponds to antenna 216A; antenna 516B corresponds to antenna 216B; and transmitter 511 corresponds to modulator 205.

As described hereinbefore, in the master and slave communication devices of the third embodiment of the present invention, sync timing adjustment is performed exclusively in the master communication device, which can be designed to be large. This allows the slave communication device such as a portable device to have a simplified receiver configuration, thereby being reduced in size, price, and power consumption. The description hereinabove does not include the modulation scheme for communication with a reflected wave; however, it is possible to use OOK, BPSK, PPM or the like.

Fourth Exemplary Embodiment

Figure 7:
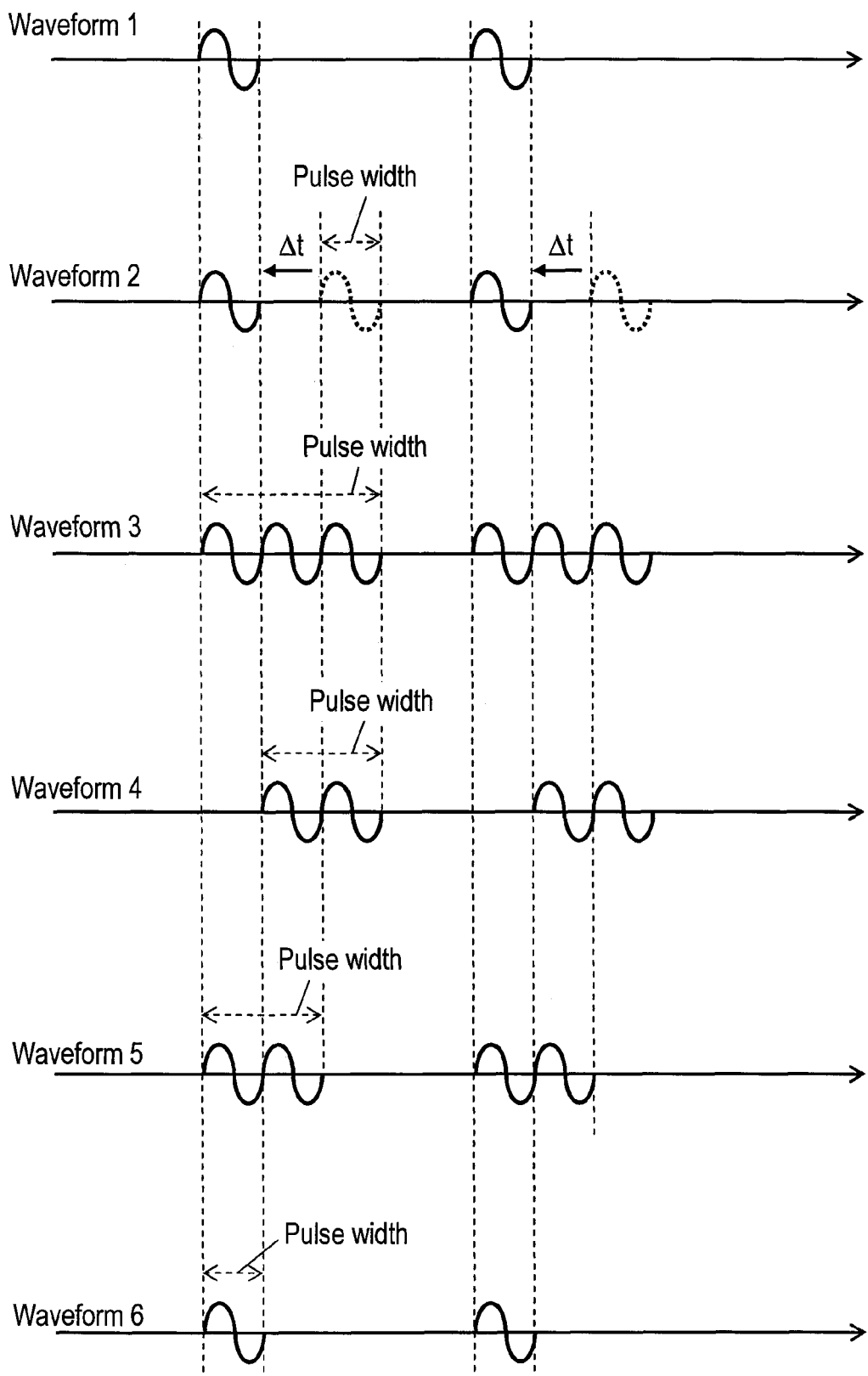
FIG. 7 is a diagram of pulse waveforms in a master communication device of a fourth embodiment of the present invention.

FIG. 7 is a diagram of pulse waveforms in a master communication device of a fourth embodiment of the present invention and shows examples of the pulse waveform of a signal transmitted for synchronization. The present embodiment differs from the first embodiment in that at the time of generation timing adjustment, synchronization is achieved by changing the pulse width of pulses to be transmitted. Waveform 1 of FIG. 7 is a correlated signal of the slave communication device, and waveform 2 of FIG. 7 shown in dashed line is a transmission signal waveform from the master communication device. These signals are synchronized by performing generation timing adjustment in such a manner as to change the generation timing of dashed-line waveform 2 of FIG. 7 to the solid-line waveform by Δt. However, for example in pulse communication, it is difficult to calculate a time lag of Δt because the waveforms overlap each other only for a short time and have no correlation for a long time.

To overcome this problem, waveform 3 of FIG. 7 having a large pulse width is used as a transmission signal. Waveform 3 of FIG. 7 has a pulse width large enough to have a correlation with waveform 1 of FIG. 7 and can be synchronized with waveform 1 at either timing of its three repetition periods. Repeated correlations are performed between waveform 1 and waveforms 4 and 5 of FIG. 7 which have a slightly reduced pulse width. Finally, synchronization is completed between waveform 1 and waveform 6 of FIG. 7 which is exactly correlated with waveform 1.

In the aforementioned structure, sync adjustment is performed by changing the pulse width of pulses to be transmitted by the master communication device, which can be designed to be large. This allows the slave communication device such as a portable device to have a simplified receiver configuration, thereby being reduced in size, price, and power consumption.

The present embodiment describes the example of serially-connected wave elements which are equal in amplitude and phase; however, it is alternatively possible to change the amplitude so that the envelope can be, for example, Gaussian Mono Pulse. It is also possible to change phase and frequency between the center and both ends or between the former half and the latter half of pulses. This enables the correlation position to be estimated based on the difference in amplitude and phase in positions such as the former half and the latter half of a pulse signal after the pulse signal is correlated.

Fifth Exemplary Embodiment

Figure 8:
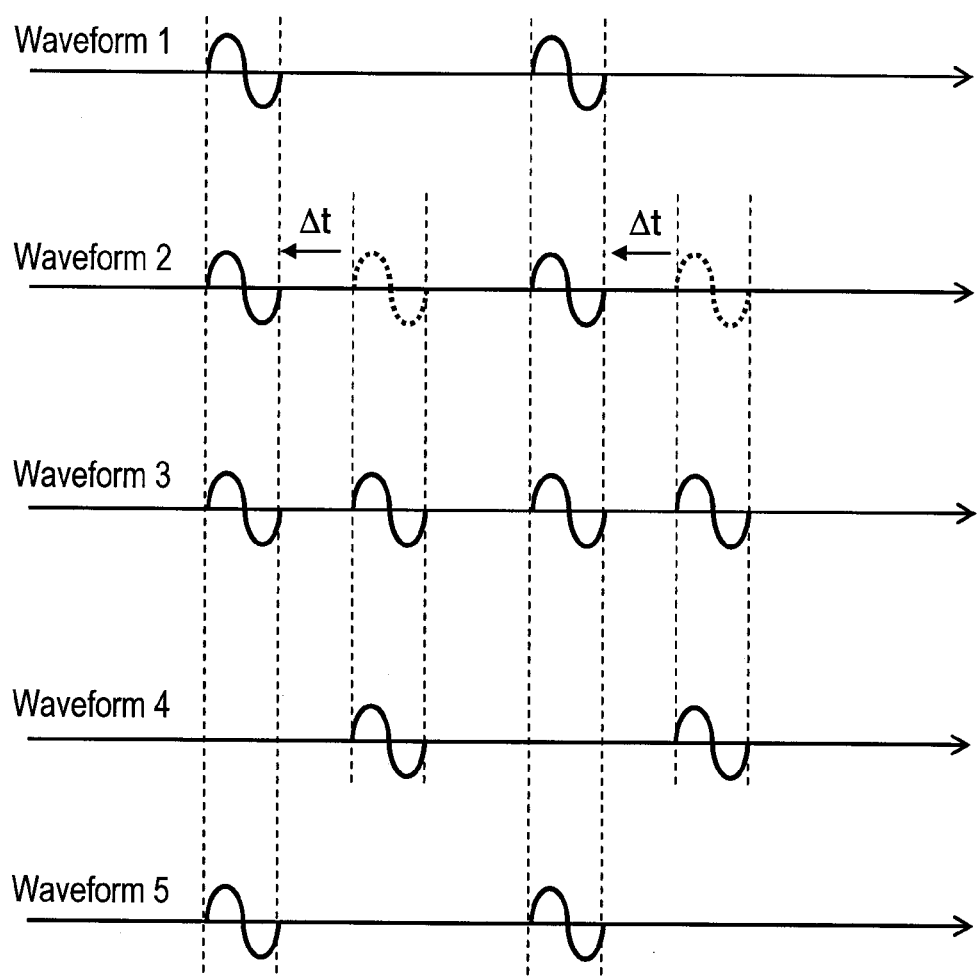
FIG. 8 is a diagram of pulse waveforms in a master communication device of a fifth embodiment of the present invention.
Figure 9A:
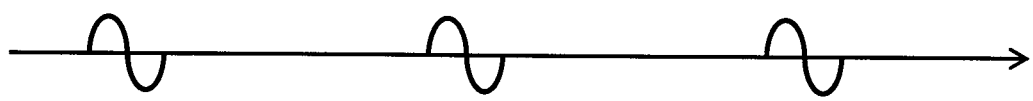
FIG. 9A is a diagram of a first pulse waveform indicating the operation of the master communication device of the fifth embodiment.
Figure 9B:
FIG. 9B is a second pulse waveform diagram indicating the operation of the master communication device of the fifth embodiment.
Figure 9C:
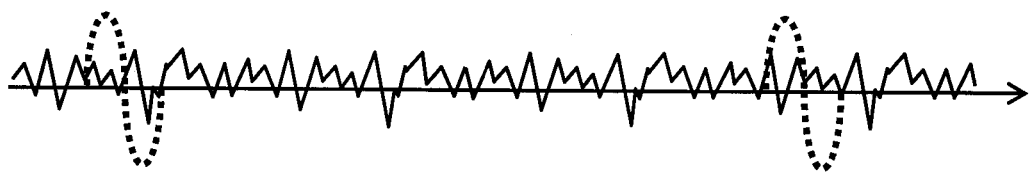
FIG. 9C is a third pulse waveform diagram indicating the operation of the master communication device of the fifth embodiment.

FIG. 8 is a diagram of pulse waveforms in a master communication device of a fifth embodiment of the present invention. FIGS. 9A to 9C are diagrams of pulse waveforms indicating the operation of the master communication device of the present embodiment and show examples of the waveform of a signal which is transmitted to be synchronized with the slave communication device. The present embodiment differs from the fourth embodiment in that generation timing adjustment is performed by changing not the pulse width but the number of pulses to be transmitted.

The following is a description of increasing the number of pulses by the master communication device of the present embodiment with reference to FIG. 8. Waveform 1 of FIG. 8 is a correlated signal of the slave communication device, and waveform 2 of FIG. 8 shown in dashed line is a transmission signal waveform from the master communication device. These waveforms can be synchronized with each other by changing the waveform generation timing of dashed-line waveform 2 of FIG. 8 by Δt so as to be overlapped with the solid-line waveform. While the fourth embodiment increases the pulse width, the present embodiment uses waveform 3 of FIG. 8 having a large number of pulses as a transmission signal. Waveform 3 of FIG. 8 has a large number of pulses and can be correlated with waveform 1 of FIG. 8. Waveform 3 of FIG. 8 can be synchronized with waveform 1 by either one of the two pulses. Then, correlation is performed between waveform 1 and waveforms 4 and 5 of FIG. 8 having a slightly reduced number of pulses. Finally, synchronization is completed between waveform 1 and waveform 5 of FIG. 8 which is exactly correlated with waveform 1.

The following is a description of reducing the number of pulses by the master communication device with reference to FIGS. 9A to 9C. When the signal power-to-noise power ratio is large, the noise power can be ignored and the reception signal has a waveform shown in FIG. 9A. However, in such a case that the communication distance is large; that another device is in operation near the slave communication device; or that the master communication device itself causes loud noise, the noise power becomes so large relative to the signal power that the signal is buried in noise as shown in FIG. 9B. This makes it difficult to detect a signal that is not yet synchronized or correlated.

To overcome this problem, a signal is transmitted by reducing the number of pulses and increasing the peak voltage of each pulse as shown in FIG. 9C. The high peak voltage allows the ratio of the signal power to the noise power to be larger regardless of the small number of pulses. This facilitates the detection, demodulation, and hence synchronization of signals.

As described hereinbefore, in the present embodiment, sync adjustment to change the number of pulses to be transmitted is performed by the master communication device, which can be designed to be large. This allows the slave communication device such as a portable device to have a simplified receiver configuration, thereby being reduced in size, price, and power consumption.

Sixth Exemplary Embodiment

Figure 10:
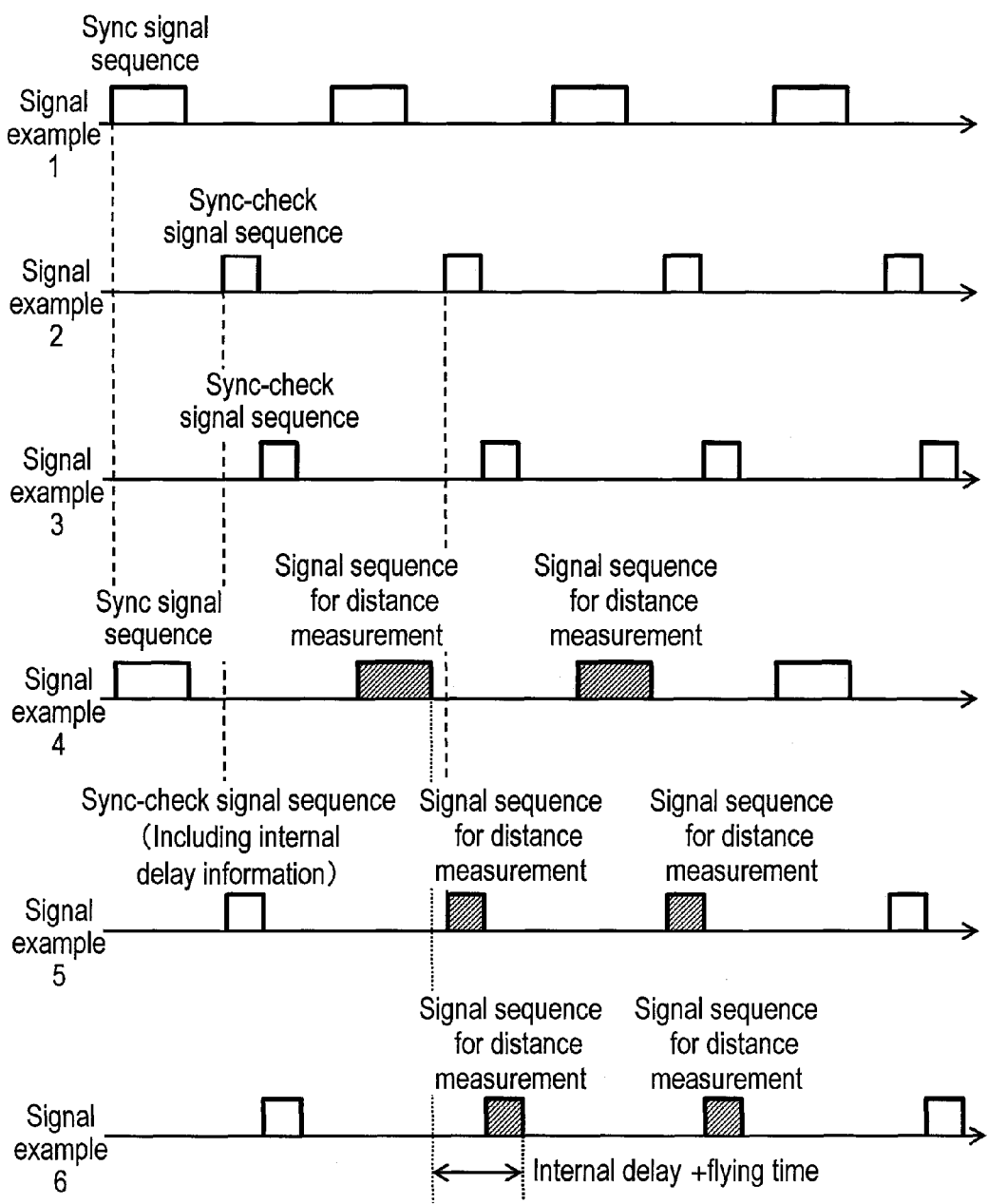
FIG. 10 is a communication signal sequence diagram of a master communication device and a slave communication device of a sixth embodiment of the present invention.
Figure 11:
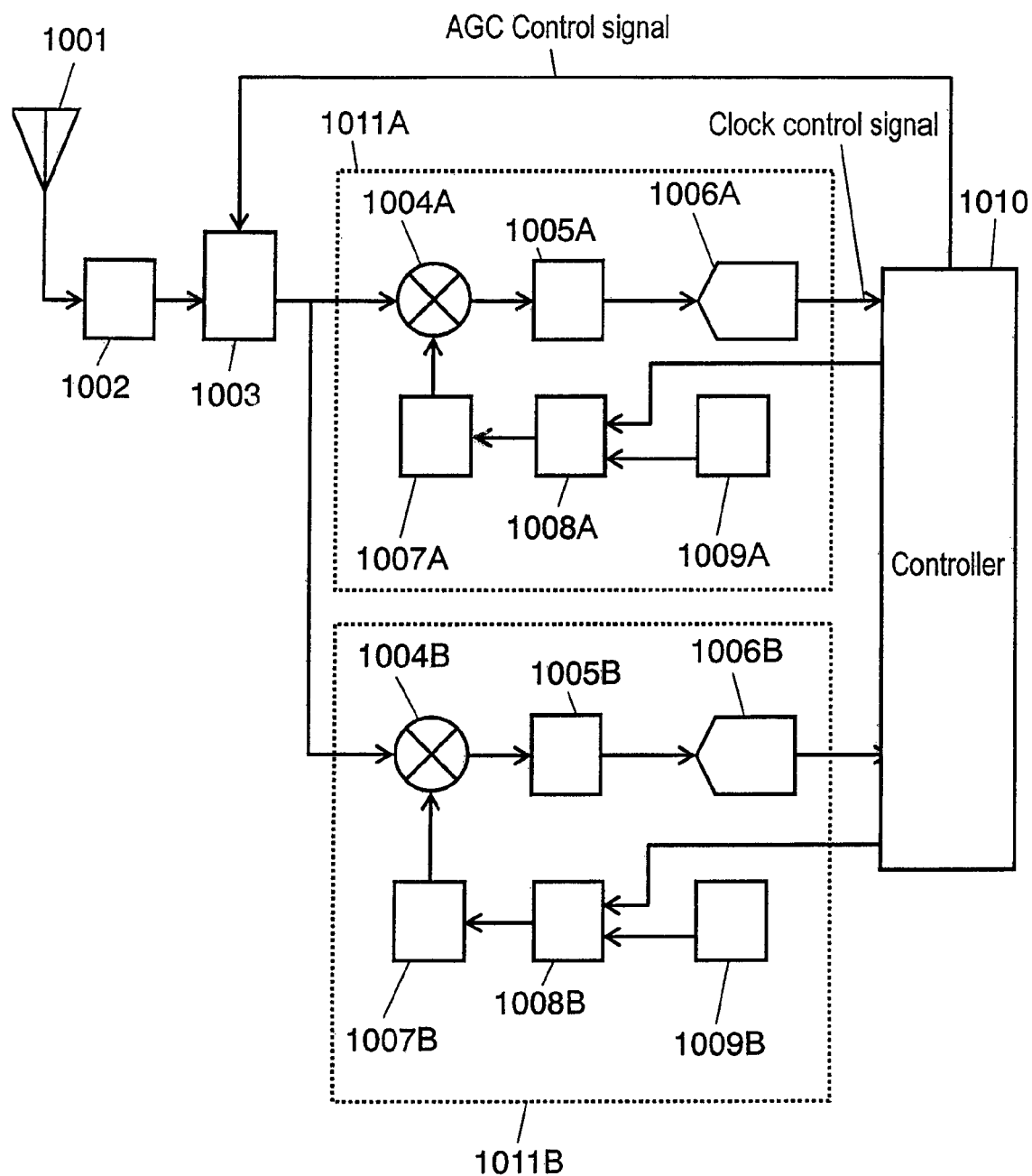
FIG. 11 is a block diagram showing a structure of a conventional communication device.
Figure 12:
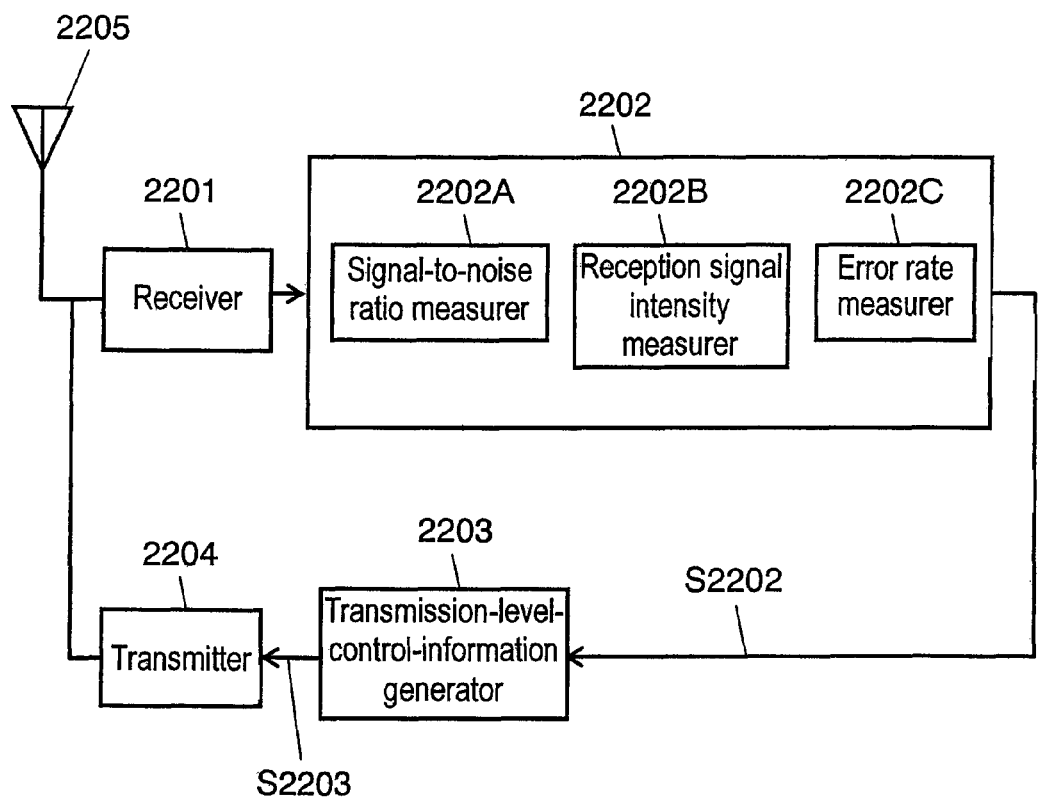
FIG. 12 is a block diagram showing a structure of another conventional communication device.

FIG. 10 is a communication signal sequence diagram of a master communication device and a slave communication device of a sixth embodiment of the present invention and shows examples of signal timing. The present embodiment uses the master communication device and the slave communication device of either one of the first to fifth embodiments so as to describe a method for calculating the distance between the communication devices using a sync signal sequence and a sync-check signal sequence.

When a sync signal sequence shown in signal example 1 of FIG. 10 is transmitted from the master communication device and synchronously received by the slave communication device, the slave communication device transmits as sync signal generation timing information, signal example 2 of FIG. 10 which is a sync-check signal sequence. Signal example 3 of FIG. 10, which is the sync-signal-check signal sequence, reaches the master communication device with a delay corresponding to a flying time. When the distance between communication devices is measured, the master communication device transmits a signal example 4 of FIG. 10 by adding a signal sequence for distance measurement, which is a signal different from a sync signal sequence.

Upon receiving the signal containing an async signal, the slave communication device returns the signal indicating asynchronization shown in signal example 5 of FIG. 10. The master communication device includes a flying time calculator (unillustrated) for calculating the time difference between the signal for distance measurement and the signal indicating asynchronization in the receiver as shown in signal example 6 of FIG. 10. The flying time calculator calculates the flying time and the distance between the communication devices. The flying time can be easily calculated using the time difference between the signal transmitted from the master communication device and the return signal from the slave communication device. In short, the flying time is the time obtained by subtracting the response time in the slave communication device from the time difference. The flying time can be reduced in half to obtain a flying time for a signal to be transmitted from the slave communication device to the master communication device or from the master communication device to the slave communication device. The distance can be calculated from the flying time by multiplying the flying time by the speed of electromagnetic wave.

The internal delay between the reception of the signal for distance measurement and the return of the signal indicating asynchronization by the slave communication device can be subtracted from the time difference if the slave communication device previously measures the internal delay and informs the master communication device of it.

As described hereinbefore, in the master and slave communication devices of the present embodiment, sync timing adjustment is performed exclusively in the master communication device, which can be designed to be large. This allows the slave communication device such as a portable device to have a simplified receiver configuration, thereby being reduced in size, price, and power consumption. The use of the signal for sync timing adjustment achieves a master communication device and a slave communication device, each of which can measure the distance between itself and another communication device.

INDUSTRIAL APPLICABILITY

As described hereinbefore, in the master and slave communication devices of the present invention, timing adjustment is performed in the master communication device with a sync timing adjustment feature. This can provide components that are conventionally required on the receiver side of every device such as multistage receiving-system branches and synchronization loops only in the master communication device. As a result, the slave communication device with no sync timing adjustment feature can have a simplified receiver configuration, thereby being reduced in power consumption and price. The master and slave communication devices of the present invention can be usefully applied to data communication devices, UWB wireless devices, and the like. In these devices, wide band signals such as signals having pulse waveforms are used to create a seamless network by wirelessly connecting AV devices and personal computers to each other.

The invention claimed is:

1. A master communication device for communicating in synchronization with a slave communication device with no sync timing adjustment feature, the master communication device comprising:
   a transmission-signal-generation-timing adjuster for receiving sync signal generation timing information from the slave communication device and adjusting timing of a transmission signal to be subsequently transmitted to the slave communication device, the sync signal generation timing information indicating a generation timing of a sync signal to be used when the slave communication device receives a transmission signal from the master communication device and for adjusting a transmission timing of a signal to be transmitted to the slave communication device based on the sync signal generation timing information, wherein adjusting the transmission timing of the signal to be transmitted to the slave communication device comprises establishing, in the master communication device, frame synchronization between the master communication device and the slave communication device that is to receive the transmission signal by establishing a coincidence of start positions of a code sequence generated by the slave communication device and a code sequence transmitted by the master communication device and establishing a coincidence of start positions of a pulse signal generated by the slave communication device and a pulse signal transmitted by the master communication device; and
   a transmitter for transmitting the transmission signal at the transmission timing thus adjusted when synchronization is established, wherein
   the transmission-signal-generation-timing adjuster adjusts a generation timing of the transmission signal until the slave communication device can receive the transmission signal from the master communication device.

2. The master communication device of claim 1, wherein the transmission-signal-generation-timing adjuster includes a variable delay unit capable of varying a delay time of a signal.

3. The master communication device of claim 1, wherein the transmitter includes:
   a pulse generator capable of arbitrarily changing a pulse generation time; and a modulator for modulating pulses, the pulses being communication data to be transmitted to the slave communication device and being generated by the pulse generator, wherein the transmission-signal-generation-timing adjuster adjusts at least one of the generation timing of the pulses and the generation timing of frames which are each a series of the communication data encoded.

4. The master communication device of claim 1, wherein the transmission-signal-generation-timing adjuster includes a transmission timing storage for storing respective transmission timings corresponding to the plurality of slave communication devices, and the transmitter transmits the transmission signal to the plurality of slave communication devices at the respective transmission timings stored in the transmission timing storage.

5. The master communication device of claim 1, wherein the plurality of transmitters communicate with the plurality of slave communication devices at the respective transmission-signal-generation-timing transmission timings respective transmission timings from adjuster, corresponding to the plurality of slave communication devices.

6. The master communication device of claim 1, wherein the transmitter includes a pulse generator for changing at least one of a shape and repetition intervals of generated pulses, and upon starting a synchronous operation with the slave communication device, the transmitter transmits pulses with a high ease of synchronization acquisition first and then switches the pulses with pulses capable of precise synchronization.

7. The master communication device of claim 6, wherein the pulse generator changes a width of the generated pulses, and upon starting a synchronous operation with the slave communication device, the transmitter transmits pulses having a width large enough to have time to be correlated by the slave communication device first and then switches the pulses with short-width pulses capable of precise synchronization.

8. The master communication device of claim 6, wherein the pulse generator changes repetition intervals of the generated pulses, and upon starting a synchronous operation with the slave communication device, the transmitter transmits pulses with short repetition intervals so as to transmit the pulses at frequent intervals first, and then switches the pulses with pulses with long repetition intervals capable of precise synchronization.

9. The master communication device of claim 1 further comprising a flying time calculator for calculating a distance to the slave communication device, wherein the transmission-signal-generation-timing adjuster changes the repetition intervals intentionally and arbitrarily so as to control the transmission timing; and the flying time calculator calculates the distance to the slave communication device based on time elapsed to obtain the sync signal generation timing information.

10. A slave communication device with no sync timing adjustment feature for communicating in synchronization with a master communication device with a sync timing adjustment feature for establishing synchronization at the master communication device to facilitate transmission of a transmission signal to the slave communication device, the slave communication device comprising:

a sync signal generator for generating a sync signal to be used upon receiving a transmission signal from the master communication device;

a correlator for correlating the transmission signal from the master communication device with the sync signal;

a correlation detector for detecting correlation from an output of the correlator, the correlation detector comprising: a frame acquisition-and-correlation determiner to detect a deviation between a code sequence generated by the slave communication device and a code sequence generated by the master communication device, and a pulse acquisition-and-correlation determiner to detect a deviation between a pulse signal generated by the slave communication device and a pulse signal transmitted by the master communication device;

a timing information transmitter for transmitting an output of the correlation detector as sync signal generation timing information to the master communication device for adjusting transmission timing of the transmission signal transmitted from the master communication device to establish, at the master communication device, synchronization between the master and communication devices before data is transmitted between the master and slave communication devices; and a receiver for receiving the transmission signal comprising the transmission timing adjusted by the master communication device based on the sync signal generation timing information transmitted by the slave communication device.

11. The slave communication device of claim 10, wherein the sync signal generation timing information includes pulse phase correlation for pulse synchronization.

12. The slave communication device of claim 10, wherein the sync signal generation timing information includes correlation with a frame for frame synchronization.

13. The slave communication device of claim 10, wherein the timing information transmitter transmits the sync signal generation timing information by changing a reflection condition of the transmission signal from the master communication device.

14. The slave communication device of claim 10 further comprising a received-power detector that is operable to activate a pulse generator when signal reception is detected and deactivates the pulse generator when signal reception is not detected.

15. A master communication device communicating in synchronization with a slave communication device with no sync timing adjustment feature, the master communication device comprising:

a transmission-signal-generation-timing adjuster for receiving sync signal generation timing information from the slave communication device, the sync signal generation timing information indicating a generation timing of a sync signal to be used when the slave communication device receives a transmission signal from the master communication device and for adjusting a transmission timing of a signal to be transmitted to the slave communication device based on the sync signal generation timing information; and a transmitter for transmitting the transmission signal at the transmission timing thus adjusted, the transmitter including a pulse generator for changing at least one of a shape and repetition intervals of generated pulses and, upon starting a synchronous operation with the slave communication device, the transmitter transmits pulses with a high ease of synchronization acquisition first and then switches the pulses with pulses capable of precise synchronization, wherein the pulse generator changes repetition intervals of the generated pulses, and upon starting a synchronous operation with the slave communication device, the transmitter transmits pulses with a high peak voltage and long repetition intervals so as to transmit the pulses at infrequent intervals first, and then switches the pulses with pulses with short repetition intervals, further wherein the transmission-signal-generation-timing adjuster adjusts a generation timing of the transmission signal until the slave communication device can receive the transmission signal from the master communication device.

* * * * *